Patented Dec. 8, 1936

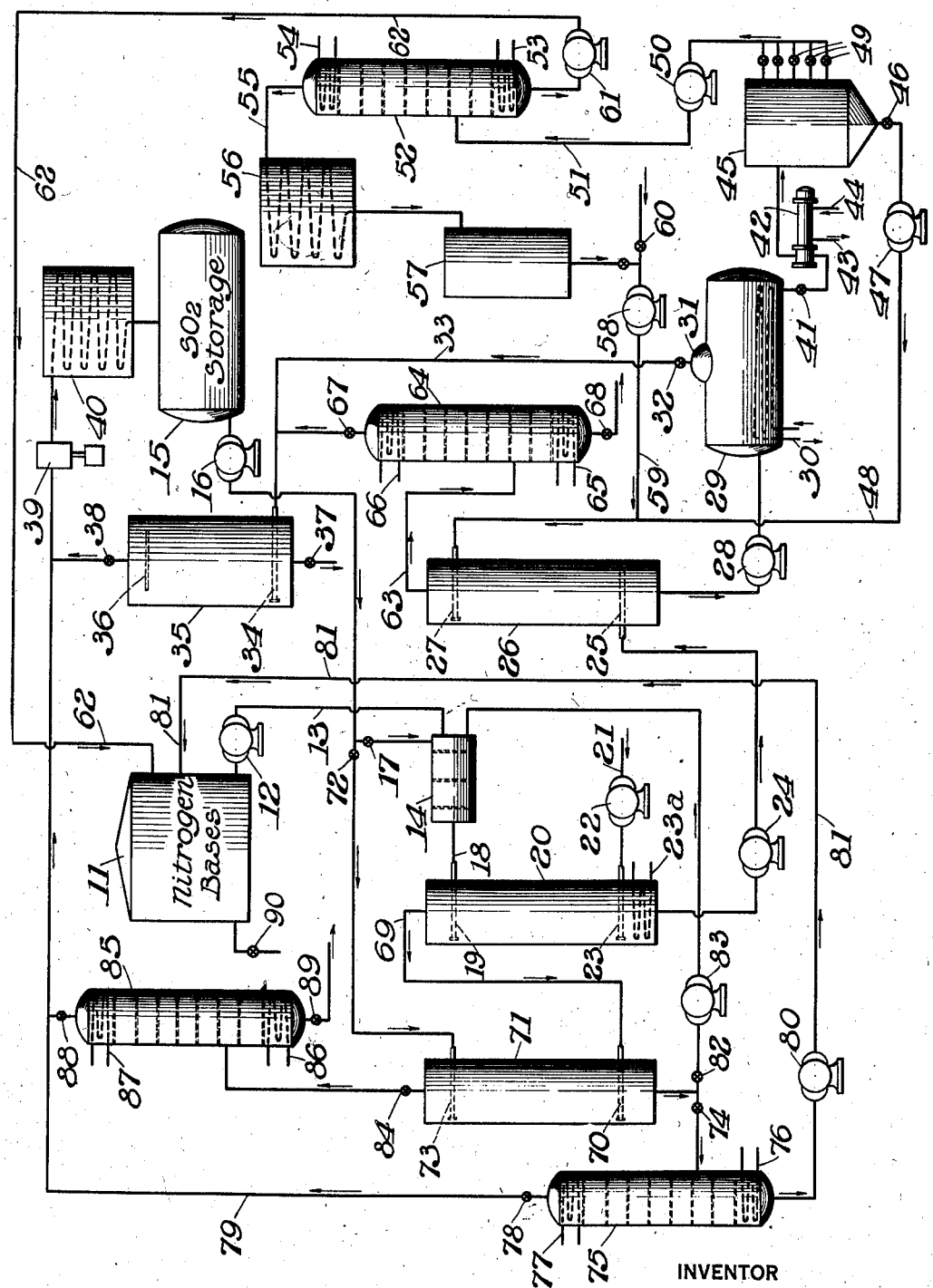

2,063,564

UNITED STATES PATENT OFFICE 2,063,564

SEPARATION OF NITROGEN BASES

John C. Stauffer, Chicago, Ill., assignor to Standard Oil Company, Chicago, Ill., a corporation of Indiana Application June 26, 1933, Serial No. 677,741

7 Claims. (Cl. 196—37)

This invention relates to the separation of nitrogen bases from hydrocarbons and more particularly relates to the separation of nitrogen bases from hydrocarbons by means of sulfur dioxide or carbon dioxide or an aqueous solution of one of these materials. It still more particularly relates to the recovery of nitrogen bases used as solvents for the fractionation of hydrocarbon mixtures.

It is an object of my invention to provide a process for the separation of a nitrogen base from hydrocarbons without distillation of the nitrogen base. It is a further object to provide certain improvements in solvent fractionation processes using a nitrogen base as the solvent or as a component of the solvent. More particularly, it is an object to provide means for the removal of nitrogen base used in such a process by scrubbing with sulfur dioxide, carbon dioxide or an aqueous solution of one of these materials. Further and more detailed objects of my invention will become apparent as the description proceeds.

A great many organic compounds belonging to the class of nitrogen bases are excellent solvents for the fractionation of hydrocarbon mixtures, for instance, the fractionation of lubricating oil stocks to produce a highly paraffinic raffinate fraction, the fractionation of kerosene stocks to remove the smoky aromatic constituents, the fractionation of motor fuel stocks to produce a high antiknock extract fraction, etc. Although these nitrogen bases by themselves are useful for this purpose they are still more useful in conjunction with liquid sulfur dioxide or liquid carbon dioxide.

The chief detriment in the use of these materials in the past has been the fact that they are in general of low chemical stability and cannot withstand the high temperatures incident to their recovery from the separated hydrocarbon materials by distillation following the solvent fractionation and because their separation by distillation methods is in many cases extremely difficult or completely impossible due to the fact that their boiling points lie within the range of boiling points of the hydrocarbon mixtures being treated.

I have solved these difficulties by providing a process in which the nitrogen base can be removed readily by a simple scrubbing process, concentrated without overhead distillation, and recycled to the solvent fractionation step. My invention can more readily be explained by reference to the accompanying drawing which represents a conventionalized flow diagram of one specific embodiment of my process.

Storage tank 11 contains a nitrogen base which may, for example, suitably be quinoline or one of the other nitrogen bases mentioned hereafter. The nitrogen base is removed from tank 11 by means of pump 12 and line 13 and passes into mixer 14. Simultaneously liquid sulfur dioxide, or liquid carbon dioxide, preferably the former, is removed from pressure storage tank 15 by means of pump 16 and passes through valve 17 to mixer 14. The mixed solvent from mixer 14 passes through line 18 (which may advantageously contain a cooler) into downwardly directed spray 19 located near the top of countercurrent contacting tower 20.

Simultaneously, the stock to be treated, for instance, a motor fuel stock at the desired extraction temperature is introduced, from a source not shown, by means of line 21 and pump 22 into upwardly directed spray 23 located near the bottom of tower 20. The rising stream of oil passes in countercurrent contact with the downwardly directed stream of mixed solvent. The mixed solvent, carrying the extract constituents of the motor fuel stock, is withdrawn from the base of tower 20. Cooling coil 23a may be used to disengage the more paraffinic constituents of the extract and thus provide desirable fractionation. Pump 24 forces the extract into upwardly directed spray 25 located near the bottom of scrubbing tower 26. Simultaneously, water or a dilute aqueous solution of sulfur dioxide, is introduced into downwardly directed spray 27, located near the top of scrubbing tower 26. In some instances the specific gravity of the material introduced through spray 25 may be higher than that of the material introduced through spray 27 in which case the positions of these two sprays must, of course, be reversed. Alternatively, scrubbing tower 26 can be replaced by a batch agitator. The water coming in contact with the sulfur dioxide and nitrogen base promotes a chemical reaction which in the case of quinoline, for example, is as follows:

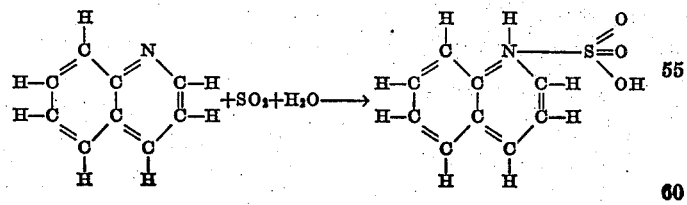

As a result the quinoline and sulfur dioxide both pass into the aqueous phase and are carried downward in tower 26 to the base thereof from which they are removed by means of pump 28 and passed to still 29 which may suitably be heated by means of steam coil 30. The degree of heating is such as to cause at least the greater portion of the sulfur dioxide present to pass from dome 31 of still 29 through valve 32 and line 33 into spray 34 of drying tower 35. This tower contains sulfuric acid through which the sulfur dioxide vapors bubble and to which they give up their moisture content. This drying operation is important as a means for preventing the corrosion which would otherwise ensue in the system if moist sulfur dioxide were allowed to circulate. Drying tower 35 may suitably be equipped with one or more baffles 36 at the top above the sulfuric acid level in order to eliminate entrainment of sulfuric acid in the sulfur dioxide. When the drying power of the sulfuric acid has been diminished it may be withdrawn through valve 37 and fresh sulfuric acid may be introduced at this same point. The dried sulfur dioxide vapors pass from tower 35 through valve 38, compressor 39 and condenser 40 back to storage tank 15.

The aqueous extract from tower 26 which has had all or most of its sulfur dioxide content removed in still 29 is removed therefrom through valve 41 and passes, if desired, through cooler 42 where it comes in indirect contact with a cooling medium introduced through line 44 and withdrawn through line 43. The cooled residual aqueous extract then passes into separator 45 where it separates into a predominantly aqueous lower layer and a predominantly nitrogen base upper layer. This is due to a reversal of the reaction given above. This reverse reaction occurs in still 29 due to the application of heat and the removal of sulfur dioxide.

The aqueous lower layer from separator 45 may be continuously or intermittently removed through valve 46 by means of pump 47 and passed through line 48 back to spray 27 in scrubbing tower 26. Any nitrogen base which may be in the aqueous layer is thereby recycled and is not lost to the system. The nitrogen base layer is simultaneously withdrawn through one of valves 49 by means of pump 50 and passes through line 51 to stripping tower 52 where its water content, if any, is removed. Stripping tower 52 is provided with a reboiling steam coil 53 in its base and a dephlegmating coil 54. The top temperature is so controlled by means of coil 54 that the water content passes off from the top of the tower in vapor form and the nitrogen base is not distilled but is withdrawn from the base of the tower. The water vapor passes through line 55, is condensed in condenser 56 and passes to separator 57 from which it is withdrawn by means of pump 58 and passes through line 59 back to spray 27 in scrubbing tower 26. Again any nitrogen base in the water is not lost to the system but is recycled. Make-up water can be introduced through valve 60 on the suction side of pump 58. The dry nitrogen base is withdrawn from tower 52 by means of pump 61 and passed through line 62 back to storage tank 11. Alternatively, it can be introduced directly into mixer 14.

Returning now to the scrubbed material which passes off from the top of scrubbing tower 26, this extract hydrocarbon fraction will in many cases contain some sulfur dioxide and it is therefore passed through line 63 into stripping tower 64 which is provided with reboiling coil 65 and dephlegmating coil 66, the latter being used to control the top temperature in such manner that the sulfur dioxide passes overhead without carrying with it any substantial amount of hydrocarbon. Sulfur dioxide vapors pass off through valve 67 into drying tower 35 and thence back to storage tank 15 as previously described. The purified hydrocarbon material is withdrawn from the base of tower 64 through valve 68 for further treatment or use as desired. If the hydrocarbon mixture introduced to the process was a motor fuel stock the material withdrawn through valve 68 will be the high antiknock fraction. In the case of the treatment of kerosene stocks and lubricating stocks, however, this fraction will be the less desirable one.

Returning now to contacting tower 20, the raffinate fraction is withdrawn from the top of the tower through line 69 (which may advantageously include a heater) and passes to upwardly directed spray 70 located near the base of scrubbing tower 71. Rising through this tower the raffinate fraction comes in countercurrent contact with a falling stream of liquid sulfur dioxide introduced from storage tank 15 by means of pump 16 through valve 72 into downwardly directed spray 73 located near the top of scrubbing tower 70. The raffinate fraction being, in general, high in nitrogen base content and low in sulfur dioxide content comes in contact with an excess of sulfur dioxide which reacts chemically with the nitrogen base and carries it with it downward through tower 71 and is removed from the base thereof through valve 74 into fractionating column 75 provided with reboiling coil 76 and dephlegmating coil 77. This tower is for the purpose of separating sulfur dioxide from the nitrogen base. Sulfur dioxide passes off from the top of the tower through valve 78, line 79, compressor 39 and condenser 40 back to storage tank 15. The nitrogen base passes from the bottom of tower 75 by means of pump 80 through line 81 back to storage tank 11. Alternatively, all or part of the sulfur dioxide nitrogen base material withdrawn from the bottom of scrubbing tower 71 may be recycled directly back to mixer 14 by means of valve 82 and pump 83.

The scrubbed raffinate hydrocarbon fraction from scrubbing tower 71 passes off the top of the tower through valve 84 into stripping tower 85 provided with reboiling coil 86 and dephlegmating coil 87. Sulfur dioxide passes overhead from this tower through valve 88 into the sulfur dioxide recovery system previously described. The raffinate from which solvent has now been completely removed is withdrawn from the bottom of tower 85 through valve 89 for further treatment or use as desired. In the case of the extraction of a motor fuel stock this raffinate contains the low antiknock constituents and may suitably be reformed by a pyrolytic cracking process thereby producing a higher antiknock material which is recycled back to the contacting step and again separated into extract and raffinate fractions. In case the stock treated in my process, however, is a kerosene stock or a lubricating oil stock the fraction removed through valve 89 will be the more desirable (more paraffinic) fraction.

It is thus seen that by scrubbing a hydrocarbon material containing a nitrogen base with sulfur dioxide alone or with aqueous sulfur dioxide or with water, sulfur dioxide being present in the hydrocarbon-nitrogen base solution, a chemical reaction ensues which results in the separation of the nitrogen base together with the sulfur dioxide and water, if any, as a liquid phase separate from the hydrocarbons. Sulfur dioxide can then be removed from this liquid phase and if water is present the nitrogen base will separate into one layer and water into another. Cooling promotes the separation. Any residual water in the nitrogen base can be stripped from it and any residual nitrogen base in the water is of no consequence since it is recycled in the process.

It is obvious from the above that my process is particularly applicable to such nitrogen bases as are insoluble in water or only slightly soluble in water. Examples of such nitrogen bases are the heterocyclic nitrogen bases, such as quinoline, quinaldine, nicotine, the picolines, butidines, collidines, pyrrol, etc.; the aromatic amines, such as aniline, dimethyl aniline, etc. and the aliphatic amines, such as dibutyl amine, tributyl amine, the mono-, di- and tri-amyl amines; and the polymethylene amines, such as cyclo hexyl amine. Nitrogen bases separated from petroleum, for instance, as described in U. S. Patent 1,838,338, can also be used.

Water soluble as well as water insoluble organic bases can be treated with liquid sulfur dioxide alone as described in the case of scrubbing tower 71 and the subsequent recovery system, but this method is, in general, not as efficient and not as desirable as the use of aqueous sulfur dioxide as in the case of scrubbing tower 26 and the subsequent recovery system.

Water soluble nitrogen bases can, in some instances, be removed by scrubbing with aqueous sulfur dioxide and then extracting the water soluble base from the water layer by use of an insoluble nitrogen base or other water insoluble organic extraction material.

As previously mentioned, carbon dioxide may be substituted for sulfur dioxide in my process, the nitrogen base being removed as a carbonate instead of as a sulfite.

Although my process is particularly adapted to the solvent fractionation of hydrocarbon mixtures and particularly to the removal of nitrogen bases used in such solvent fractionation, it will also be readily understood that it can be used for the removal of nitrogen bases naturally occurring or artificially formed in hydrocarbon mixtures, such as coal tar distillates, petroleum distillates and the like. These nitrogen bases can be removed by direct extraction with liquid sulfur dioxide alone or an aqueous sulfur dioxide solution and can be recovered as described above, accumulating in tank 11 and being withdrawn through valve 90. In some cases it will be found that it is merely necessary to add gaseous sulfur dioxide or carbon dioxide to the coal tar distillate or petroleum distillate containing nitrogen base, the gaseous material being absorbed and tending to separate out with the nitrogen base.

Although I have described my invention in connection with certain specific embodiments thereof, it will be understood that these embodiments are by way of illustration only and are not limitations on my invention. I have further utilized certain theories as possible explanations of my process but these also are by way of illustration only and I do not wish to be limited except to the scope of the appended claims in which I have set forth the novelty resident in my invention.

I claim:

1. In a process for the solvent fractionation of a mixture of hydrocarbons, the steps which comprise contacting said mixture with an incompletely water soluble nitrogen base and with liquid sulfur dioxide, separating extract and raffinate fractions, extracting at least one of said fractions with water, removing at least the greater part of the sulfur dioxide from the extract thus formed by fractional distillation, separating the remaining extract into a predominantly aqueous liquid phase and a predominantly nitrogen base liquid phase, recycling said predominantly aqueous liquid phase back to said extracting step and recycling said predominantly nitrogen base liquid phase back to said contacting step.

2. Process according to claim 1 in which the nitrogen base comprises aniline.

3. Process according to claim 1 in which the nitrogen base comprises quinoline.

4. Process according to claim 1 in which the nitrogen base is selected from the class consisting of the butyl, amyl and hexylamines.

5. A process for the solvent fractionation of a mixture of hydrocarbons, comprising contacting said mixture with a nitrogen base and with liquid sulfur dioxide, separating extract and raffinate fractions, scrubbing the extract fraction with water, removing at least the greater part of the sulfur dioxide from the water extract in vapor form, drying said sulfur dioxide, liquefying said sulfur dioxide, recycling said sulfur dioxide to said contacting step, separating the residue of said water extract into a predominantly aqueous phase and a predominantly nitrogen base phase, recycling said predominantly aqueous phase back to said scrubbing step, removing water from said predominantly nitrogen base phase, recycling the dehydrated nitrogen base back to said contacting step, scrubbing said raffinate fraction with liquid sulfur dioxide, removing residual sulfur dioxide from the scrubbed raffinate, recycling the removed sulfur dioxide back to said contacting step, and recycling the sulfur dioxide extract from the last mentioned scrubbing step back to said contacting step.

6. In a process for the solvent fractionation of a mixture of hydrocarbons, the steps which comprise contacting said mixture with an incompletely water soluble nitrogen base and with liquid sulfur dioxide, separating extract and raffinate fractions, extracting the extract fraction with water, heating the extract thus formed to distill off at least the greater part of the sulfur dioxide therefrom, separating the remainder of said last-mentioned extract into a predominantly aqueous liquid phase and a predominantly nitrogen base liquid phase, recycling said predominantly aqueous liquid phase back to said extracting step and recycling said predominantly nitrogen base liquid phase back to said contacting step.

7. A process for the solvent fractionation of a mixture of hydrocarbons comprising contacting said mixture with a nitrogen base and with liquid sulfur dioxide, separating extract and raffinate fractions, scrubbing at least one of said fractions with liquid sulfur dioxide, removing residual sulfur dioxide from the scrubbed fraction, recycling the removed sulfur dioxide back to said contacting step, and recycling the sulfur dioxide extract from the scrubbing step back to said contacting step.

JOHN C. STAUFFER.